United States Patent
Steeves et al.

(10) Patent No.: US 10,965,667 B2
(45) Date of Patent: *Mar. 30, 2021

(54) PROTECTION FROM UNFAMILIAR LOGIN LOCATIONS

(71) Applicant: Microsoft Technology Licensing, LLC, Redmond, WA (US)

(72) Inventors: David Steeves, Seattle, WA (US); Luke Abrams, Seattle, WA (US); Hersh Dangayach, White Plains, NY (US); Eric Fleischman, Redmond, WA (US); Prabu Raju, Issaquah, WA (US); Krishna Vitaldevara, Fremont, CA (US); Niyantha Shekar, Bellevue, WA (US); Payoj Baral, Redmond, WA (US); Meenakshi Ramaswamy, Bellevue, WA (US); Winfred Wong, Redmond, WA (US); Yordan Rouskov, Kirkland, WA (US); Ramesh Manne, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,270

(22) Filed: Dec. 9, 2019

(65) Prior Publication Data

US 2020/0112556 A1 Apr. 9, 2020

Related U.S. Application Data

(63) Continuation of application No. 16/041,143, filed on Jul. 20, 2018, now Pat. No. 10,505,926, which is a
(Continued)

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *G06F 21/316* (2013.01);
(Continued)

(58) Field of Classification Search
CPC ..... G06F 21/316; G06F 21/31; H04L 63/083; H04L 63/08; H04L 63/107; H04W 4/029
(Continued)

(56) References Cited

U.S. PATENT DOCUMENTS 8,065,713 B1 * 11/2011 Vainstein .............. H04L 63/102
726/2
2012/0144468 A1 * 6/2012 Pratt ....................... G06F 21/45
726/7

* cited by examiner

*Primary Examiner* — Longbit Chai
(74) *Attorney, Agent, or Firm* — Alleman Hall Creasman & Tuttle LLP (57) ABSTRACT

In one embodiment, a user authentication server may use geo-location tracking to determine whether to present an enhanced identity challenge. A communication interface 180 may receive a user login attempt by a user and a current location of the user login attempt. A data storage 150 may store a user location profile of the user. A processor 120 may execute a comparison of the current location to the user location profile. The communication interface 180 may present the user with an enhanced identity challenge before allowing user access based on the comparison.

20 Claims, 8 Drawing Sheets

Related U.S. Application Data continuation of application No. 15/664,399, filed on Jul. 31, 2017, now Pat. No. 10,033,731, which is a continuation of application No. 14/871,945, filed on Sep. 30, 2015, now Pat. No. 9,749,313, which is a continuation of application No. 13/176,762, filed on Jul. 6, 2011, now Pat. No. 9,177,125.

(60) Provisional application No. 61/491,129, filed on May 27, 2011.

(51) Int. Cl.
*H04W 4/029* (2018.01)
*H04L 29/12* (2006.01)
*H04L 29/08* (2006.01)

(52) U.S. Cl.
CPC ............ *H04L 61/609* (2013.01); *H04L 63/08* (2013.01); *H04L 67/22* (2013.01); *H04L 67/306* (2013.01); *H04W 4/029* (2018.02); *G06F 2221/2111* (2013.01)

(58) Field of Classification Search
USPC .......................................................... 726/7
See application file for complete search history.

| USER ID 302 | LOCATION 304 | RANGE 306 | TIME 308 | FREQ 310 | STATUS 312 |

300
Figure 3

| USER ID 402 | PASSWORD 404 | CHALLENGE 406 | RESPONSE 408 | DIFF 410 |

PROTECTION FROM UNFAMILIAR LOGIN LOCATIONS

PRIORITY INFORMATION

This application is a continuation of U.S. patent application Ser. No. 16/041,143 filed Jul. 20, 2018, which is a continuation of U.S. patent application Ser. No. 15/664,399 filed Jul. 31, 2017, now U.S. Pat. No. 10,033,731, which is a continuation of U.S. patent application Ser. No. 14/871,945 filed Sep. 30, 2015, now U.S. Pat. No. 9,749,313, which is a continuation from U.S. patent application Ser. No. 13/176,762, filed Jul. 6, 2011, now U.S. Pat. No. 9,177,125, which claims priority to U.S. Provisional Patent Application Ser. No. 61/491,129 filed May 27, 2011, the entire contents of which are incorporated herein by reference in their entireties.

BACKGROUND

A service, such as an e-mail account, banking service, social network, or remote work computer access, may contain sensitive data that a user does not want disseminated to the general public. Thus, a service may use password protection to restrict access to only authorized users who can authenticate a right of access to a user session. A login interface may query the user for a password having a series of characters, such as letters, numbers, and signs. An authentication service may deny access to the user if the characters are in an improper order, if the letters are in the wrong case, or if the password fails to match the stored password in any way.

The authentication service may give the user a set number of tries at providing the password before that user is blocked from further attempts to access the computing device or service. The user may then contact an administrator to access the service, after providing some proof of identification. Such proof of identification may be a government identification or a pre-registered set of questions that presumably only the user can answer. Alternately, if the user fails to provide the proper password, a computing device or service may erase data.

A malicious actor may seek to hijack a user's account by co-opting the user's password. Once the malicious actor has taken control of the account, that malicious actor may change the password, steal user data, harass the user's contacts, perform criminal acts, spy on the user's actions, or take control of the user's account.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a user authentication server using location tracking to determine whether to present an enhanced identity challenge. In one embodiment, a communication interface may receive a user login attempt by a user and a current location of the user login attempt. A data storage may store a user location profile of the user. A processor may execute a comparison of the location to the user location profile. The communication interface may present the user with an enhanced identity challenge before allowing user access based on the comparison.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a user authentication server.

A user service may use a user authentication server to determine whether a user is authorized to access the user service. The user authentication server may use a user identifier and password to authorize the user session. A user login attempt refers to the presentation by the user of the user identifier and password. Additionally, the user authentication server may factor in the location of the device making the login attempt to determine whether the increased security of an enhanced identity challenge outweighs the increased hassle to the user. The location may be a geographic location, or "geo-location", or may be a virtual location in the network. The user authentication server may derive the geo-location of the login attempt from the internet protocol (IP) address.

An enhanced identity challenge is a question that the user theoretically can answer, but no one else. The enhanced identity challenge may be a low difficulty identity challenge or a high difficulty identity challenge. A low difficulty identity challenge is a question regarding personal information that may be gleaned from other records. For example, a low difficulty identity challenge may be "What is your age?" A high difficulty identity challenge may be a question regarding personal information that the user knows, but is not present in other records. For example, a high difficulty identity challenge may be "Who was your first love?" Alternatively, the high difficulty identity challenge may send the user a short messaging system (SMS) code or email to an account address associated with the user account.

The user authentication server may be operated in an observation mode to collect a login geo-location history to create a user location profile. While in observation mode, the user authentication server may collect the geo-location of the user login attempts while not making any comparisons to the user location profile to determine if an enhanced identity challenge may be made.

The user authentication server may determine one or more home region for the user. The home region is an area centered on the home location of a user. The home region may be entered directly by the user or divined from login geo-location history, such as a geographic area with frequent user login attempts or a location with a previously solved geo-location challenge. The user authentication server may adjust size of the home region based on user activity, a system configuration, or other system properties.

A familiar location is a location for a verified user login attempt. The user login attempt may be verified through the use of the enhanced identity challenge. The user authentication server may decertify a familiar location if that familiar location has not been used for a user login attempt for a set period of time, referred to as an aging period.

The user authentication server may activate observation mode for a user upon first registration for the user service, or at later date if a local kill switch is activated. The local kill switch disables a comparison between the current geo-location and the user location profile. The user authentication server may still collect the login location history while the local kill switch is activated. The user authentication server may also have a global kill switch that disables all collection of the geo-location data for any user. The user may activate a user kill switch which may either disable the comparison between the current geo-location and the user profile, or disable all collection of the geo-location data for that user. The user may activate the user kill switch if the user is making a one-time trip to an unfamiliar location and does not want that location added to the user location profile.

Thus, in one embodiment, a user authentication server may use geo-location tracking to determine whether to present an enhanced identity challenge. A user authentication server may have a communication interface to receive a user login attempt by a user and a current geo-location of the user login attempt. A user authentication server may have a data storage to store a user location profile of the user. A user authentication server may have a processor to execute a comparison of the geo-location to the user location profile. The communication interface may present the user with an enhanced identity challenge before allowing user access based on the comparison.

Figure 1:
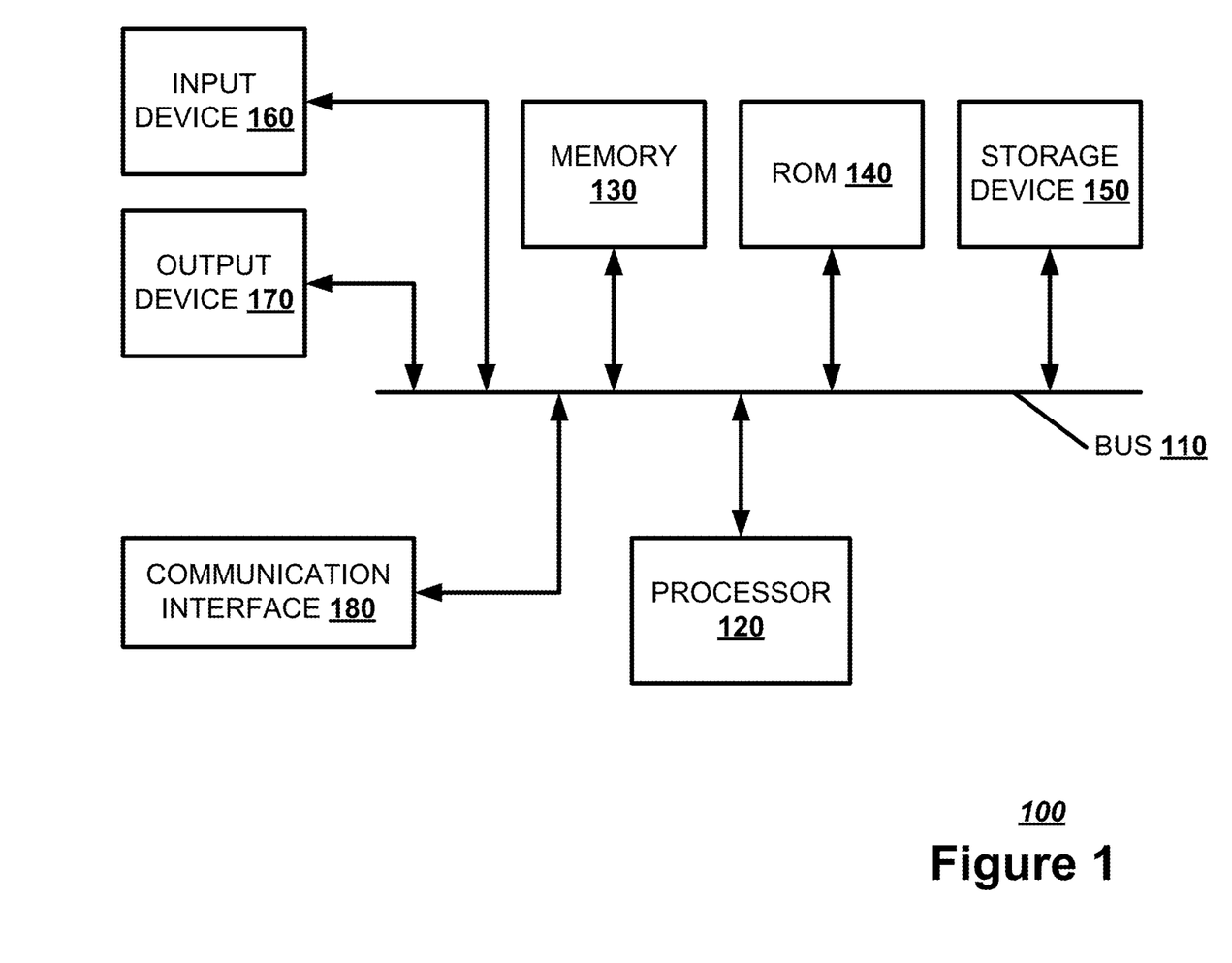
FIG. 1 illustrates a block diagram of an exemplary computing device.

FIG. 1 illustrates a block diagram of an exemplary computing device 100 which may act as a user authentication server. The computing device 100 may combine one or more of hardware, software, firmware, and system-on-a-chip technology to implement user authentication. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method. The storage device 150 may also be a database or a database interface for storing user location profiles and user authentication data.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables processing device 100 to communicate with other devices or networks. The communication interface 180 may include a network interface or a mobile transceiver interface. The communication interface 180 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2A:
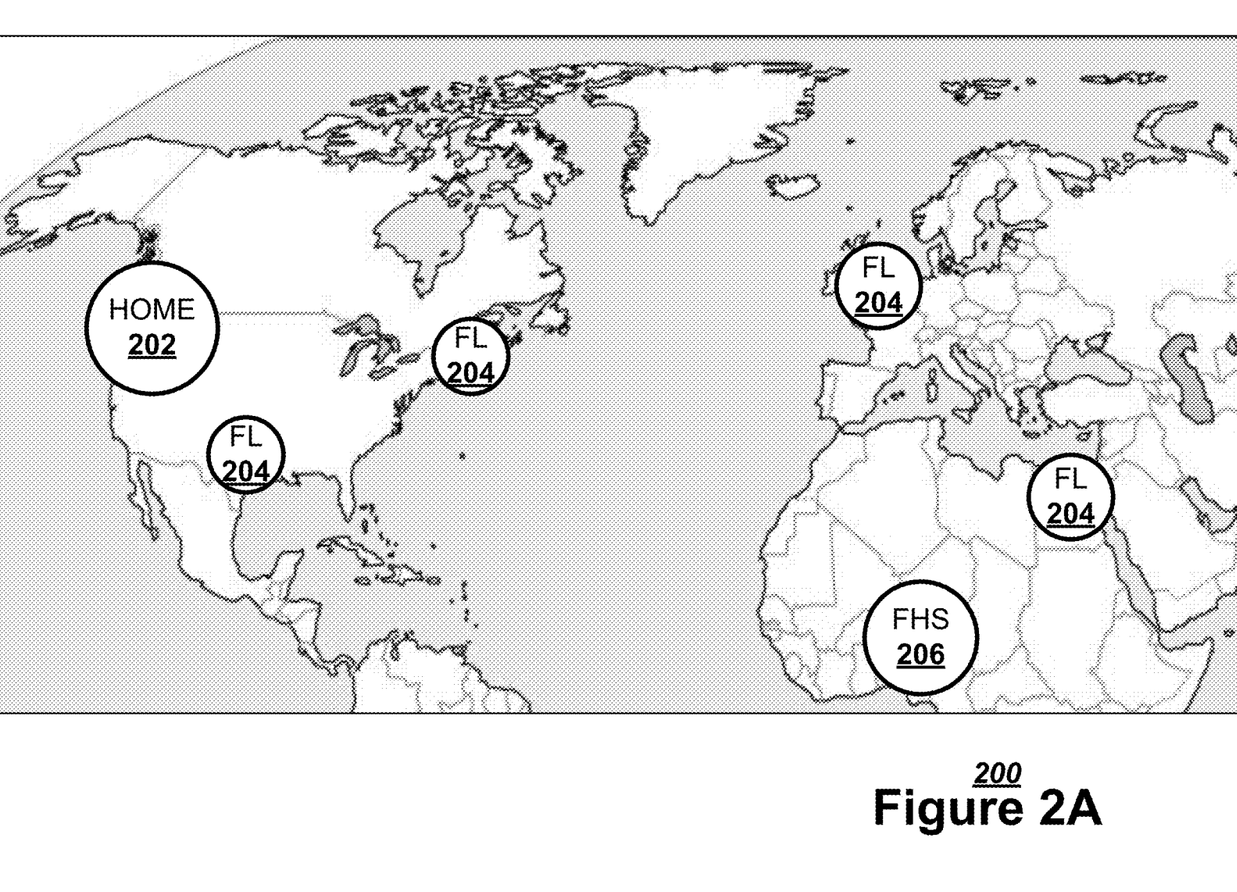
FIGS. 2A-C illustrate, in block diagrams, embodiments of location divisions.
Figure 2B:
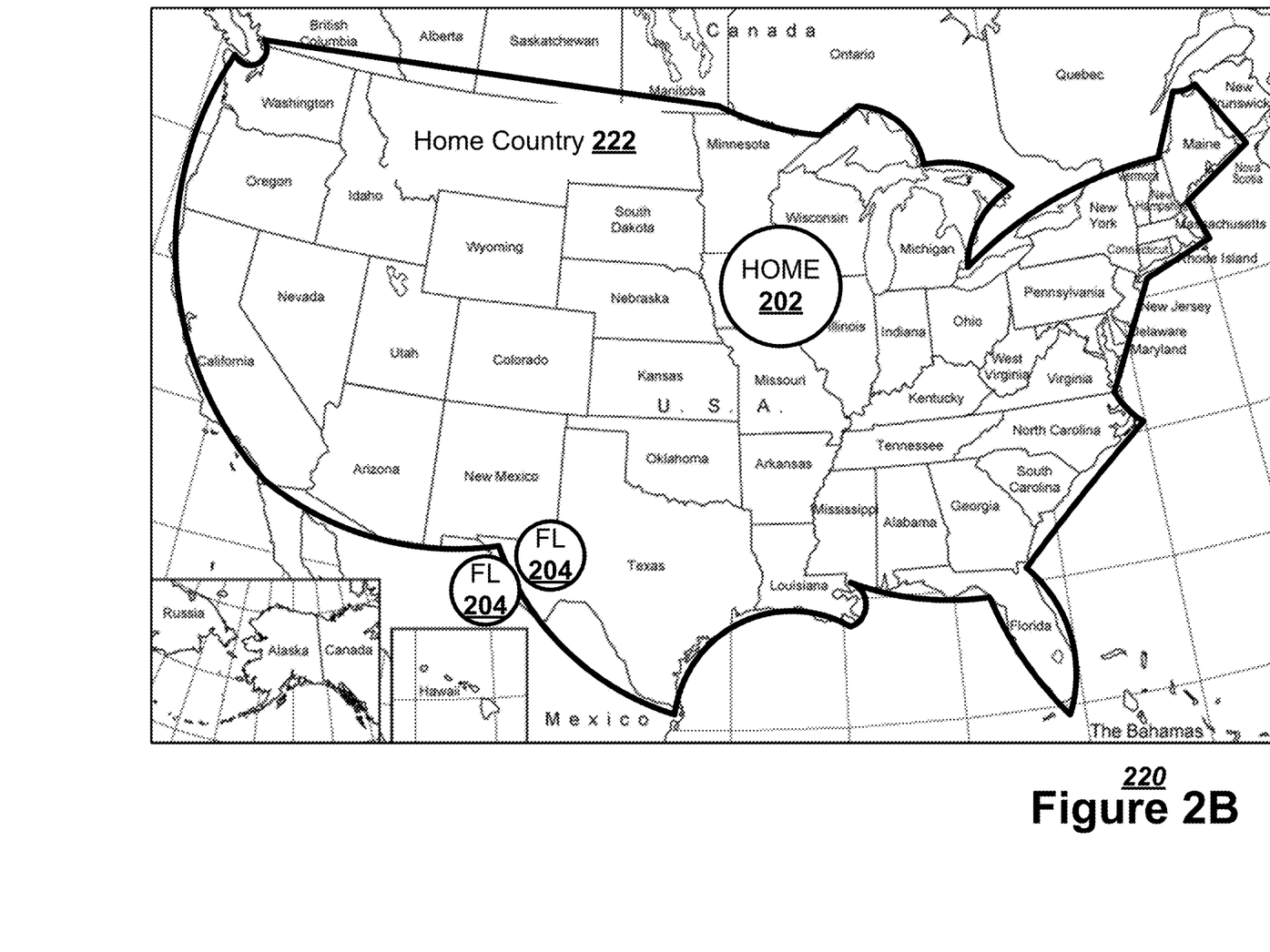
Figure 2C:
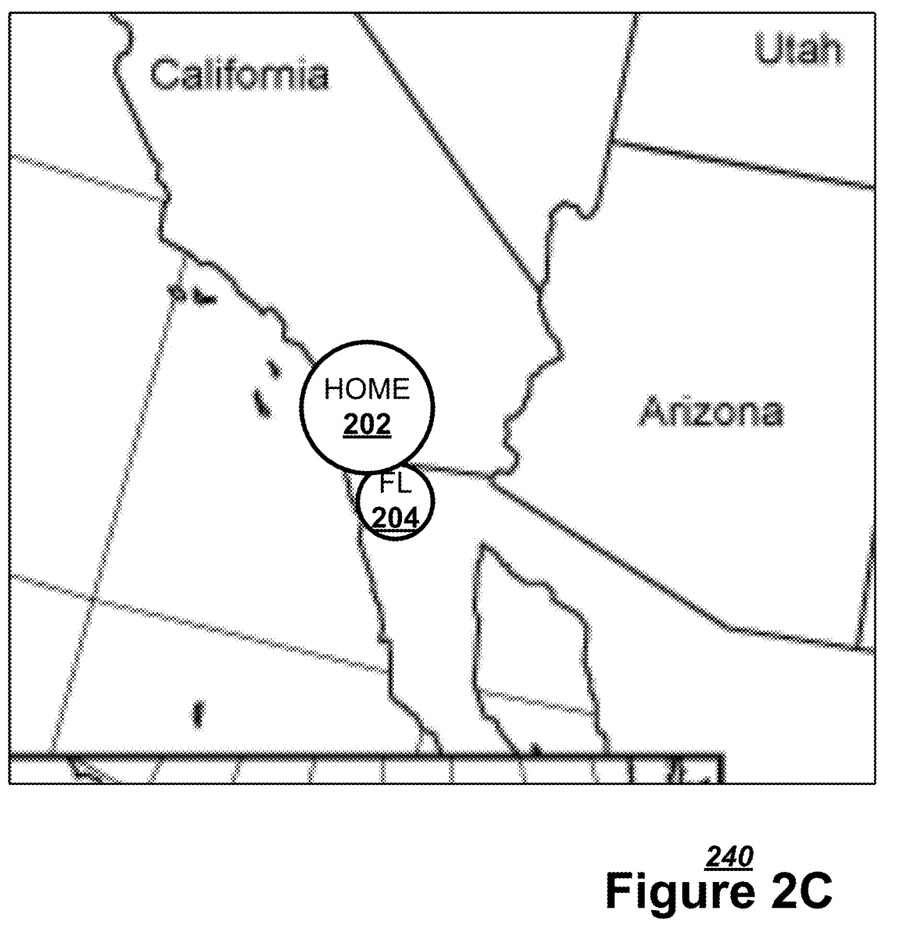

The user authentication server may store a variety of locations visited by a user as a user location profile. The user authentication server may identify a location by different designations. FIGS. 2A-C illustrate different locations with different designations. The designations may determine the level of security for a user authentication. A geographic location may be designated a home region 202, a familiar location 204, or a fraud hotspot 206. A home region 202 is a general geographic area around the primary residence of a user. The home region 202 may have a size that varies based on how far a user tends to roam from the primary residence. The home region 202 may have the lowest level of security. A familiar location (FL) 204 is the geographic area of an access point from which a user has accessed the user service and provided identity confirmation. The user may confirm his or her identity by responding to an enhanced identity challenge. The familiar location 204 may have a fairly low security. An undesignated location may have a medium level of security. A fraud hotspot (FHS) 206 is a geographic location with a reputation of containing identity thieves or other malicious actors. The user authentication server may receive updates of fraud hotspots 206 from a news or government server. The fraud hotspot 206 may have a high level of security.

For example, FIG. 2A shows a map of a portion of the Northern Hemisphere 200. A user may be based in Seattle, Wash. The user may then be associated with a home region 202 centered around Seattle, Wash. A login attempt by a user from that home region 202 may use just a password request. The user may travel frequently to Dallas, Tex.; New York, N.Y.; London, England; and Cairo, Egypt. The user may have made frequent login attempts from each of these locations, confirming the identity of the user at each location. The user authentication server may associate each of these locations with the user as a familiar location 204. A login attempt by a user from that familiar location 204 may use a password request, with a low difficulty enhanced identity challenge every other login attempt. An illicit login attempt of numerous user accounts may have been tried by a malicious actor in Abuja, Nigeria, earning a fraud hotspot 206 designation. A login attempt by a user from that fraud hotspot 206 may use a password request and a high difficulty enhanced identity challenge.

In a further example, FIG. 2B shows a map of the United States 220. A user may then be associated with a home region 202 centered around Cedar Rapids, Iowa. The user may travel frequently to El Paso, Tex. and Jaurez, Mexico. The user may have made frequent login attempts from each of these locations, designating each a familiar location 204. A familiar location 204 in a home country 222 may have a lower level of security than a familiar location 204 outside the home country 222. A login attempt by a user from the familiar location 204 outside the home country 222 may use a password request, with a low difficulty enhanced identity challenge, every login attempt.

In another example, FIG. 2C shows a map of the United States-Mexico border 220. A user may then be associated with a home region 202 centered around San Diego, Calif. The user may cross the border frequently to Tijuana, Mexico, earning a designation as a familiar location 204, or even be considered part of the home region 202. Even though the familiar location 204 is outside home country 222, the familiar location 204 may have a lower level of security as the familiar location 204 is in close proximity to the home region 202.

Figure 3:
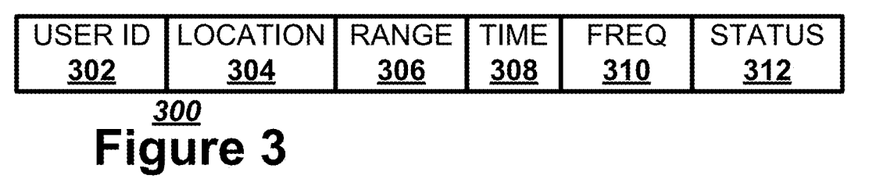
FIG. 3 illustrates, in a block diagram, one embodiment of a user location profile record.

The user authentication server may store the user location profile as a user location profile record. FIG. 3 illustrates, in a block diagram, one embodiment of a user location profile record 300. The user location profile record 300 may have a user identifier (ID) field 302 that stores a user identifier indicating the user. The user location profile record 300 may have a location field 304 indicating a location for a user login attempt. The location field 304 may indicate the location in latitude and longitude on the degree, minute, or second level. The location field 304 may also indicate the country of the location. The location field 304 may track a previous location of the user, or a familiar location entered by the user. The user location profile record 300 may have a range field 306 indicating a given range surrounding the location. Any further login attempts that are within that range may be covered by the same user location profile record 300. The user location profile record 300 may have time field 308 indicating the last time that a user attempted to login from that location. The last login time may be used to calculate a traveling distance. Traveling distance is calculated by considering how far a user may reasonably travel from the immediately previous location since the last login time. The user location profile record 300 may have a frequency (FREQ) field 310 that tracks the number of login attempts at the login location. The frequency field 310 may indicate a total number of login attempts at that login location or an average number of login attempts over a set time period. The user location profile record 300 may have a status field 312 that indicates if the location is a home region 202, a familiar location 204, or a fraud hotspot 206. The status field 312 may be assigned by a user or an administrator, or may be determined using the frequency of login attempts.

Figure 4:
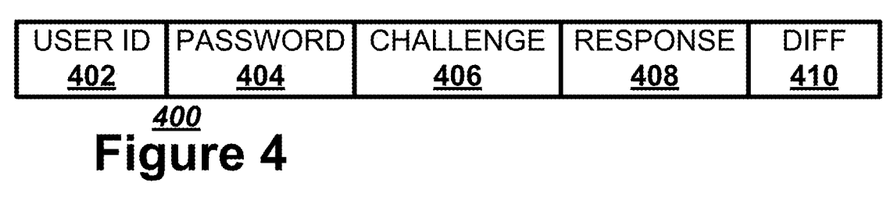
FIG. 4 illustrates, in a block diagram, one embodiment of an enhanced identity challenge record.

Based on a comparison of a user login attempt with the user location profile, a password request may be followed up with an enhanced identity challenge. FIG. 4 illustrates, in a block diagram, one embodiment of an enhanced identity challenge record. The enhanced identity challenge record 400 may have a user identifier field 402 that stores a user identifier indicating the user. The enhanced identity challenge record 400 may have a password field 404 indicating the password associated with that user identifier. The enhanced identity challenge record 400 may have a challenge field 406 indicating the enhanced identity challenge. The enhanced identity challenge may be one of a default set of questions or a question submitted by the user. The enhanced identity challenge record 400 may have a response field 408 indicating the proper answer to the enhanced identity challenge. The enhanced identity challenge record 400 may have a difficulty field 410 that indicates if the enhanced identity challenge is a high difficulty identity challenge or a low difficulty identity challenge.

Figure 5:
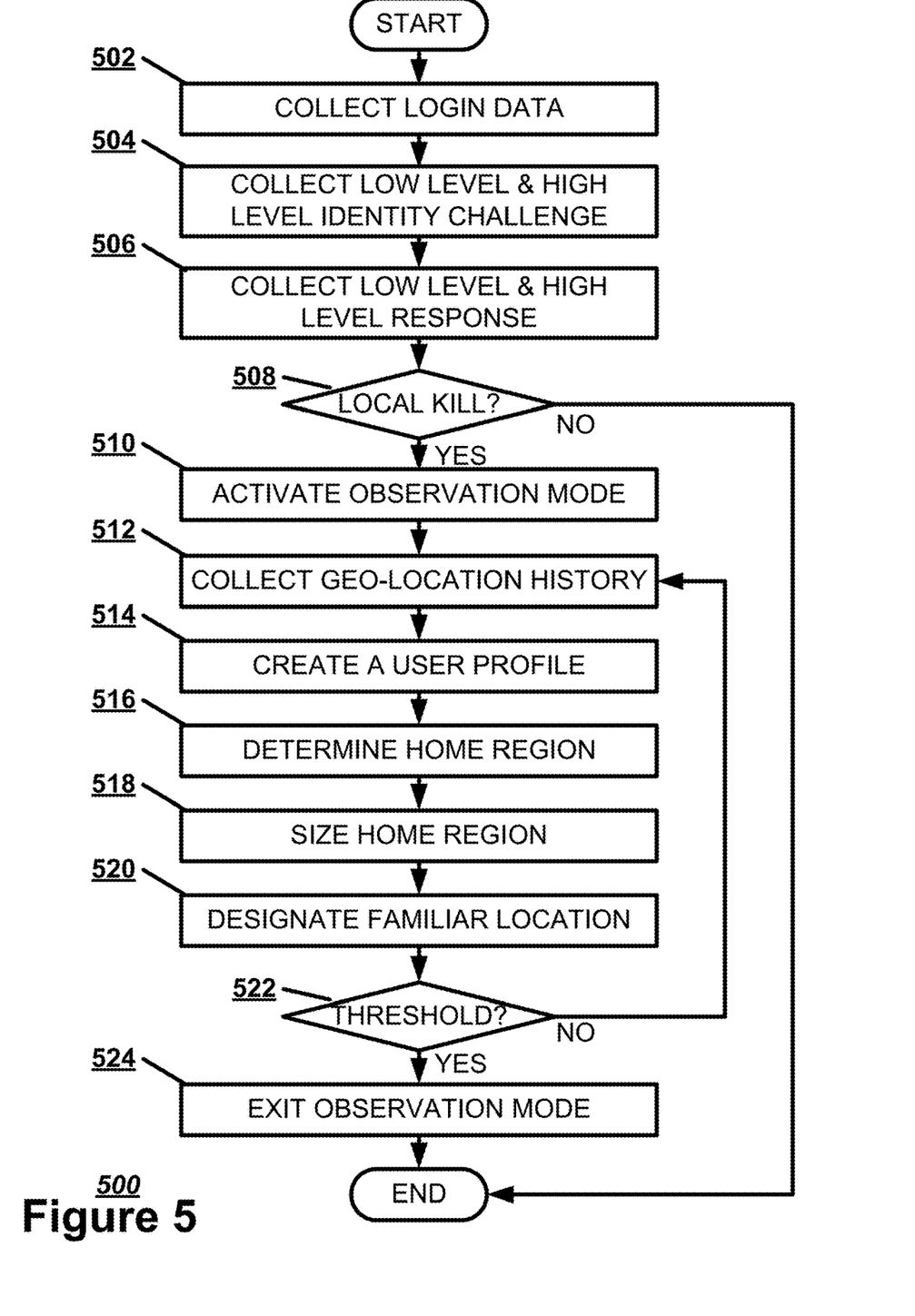
FIG. 5 illustrates, in a flowchart, one embodiment of a method for creating a user location profile.

FIG. 5 illustrates, in a flowchart, one embodiment of a method 500 for creating a user location profile. A user authentication server may collect a set of login data upon creation of the account, such as a user identifier and a password (Block 502). The user authentication server may collect a low difficulty identity challenge and a high difficulty identity challenge (Block 504). The user authentication server may collect a low difficulty identity challenge response and a high difficulty identity challenge response (Block 506). If a local kill switch has been activated (Block 508), the ability of the user authentication server to execute a comparison of a current geo-location with a user location profile is disabled. The user authentication server may activate observation mode (Block 510). In observation mode, the user authentication server records the geo-location of the user login attempts to create a user location profile but does not compare that geo-location with the user location profile. The user authentication server may collect a login location history for the user (Block 512). The user authentication server may create a user location profile associated with a user account based on the login location history (Block 514). The user authentication server may determine a home region for the user based on the login location history (Block 516). The user authentication server may size the home region based on user activity (Block 518). The user authentication server may designate a geographic location as a familiar location based on the login location history (Block 520). If the user authentication server has stored a threshold number of familiar locations, referred to as a location threshold, or has been in observation mode for a set amount of time, referred to as a learning period threshold (Block 522), then the user authentication server may exit observation mode (Block 524).

Figure 6:
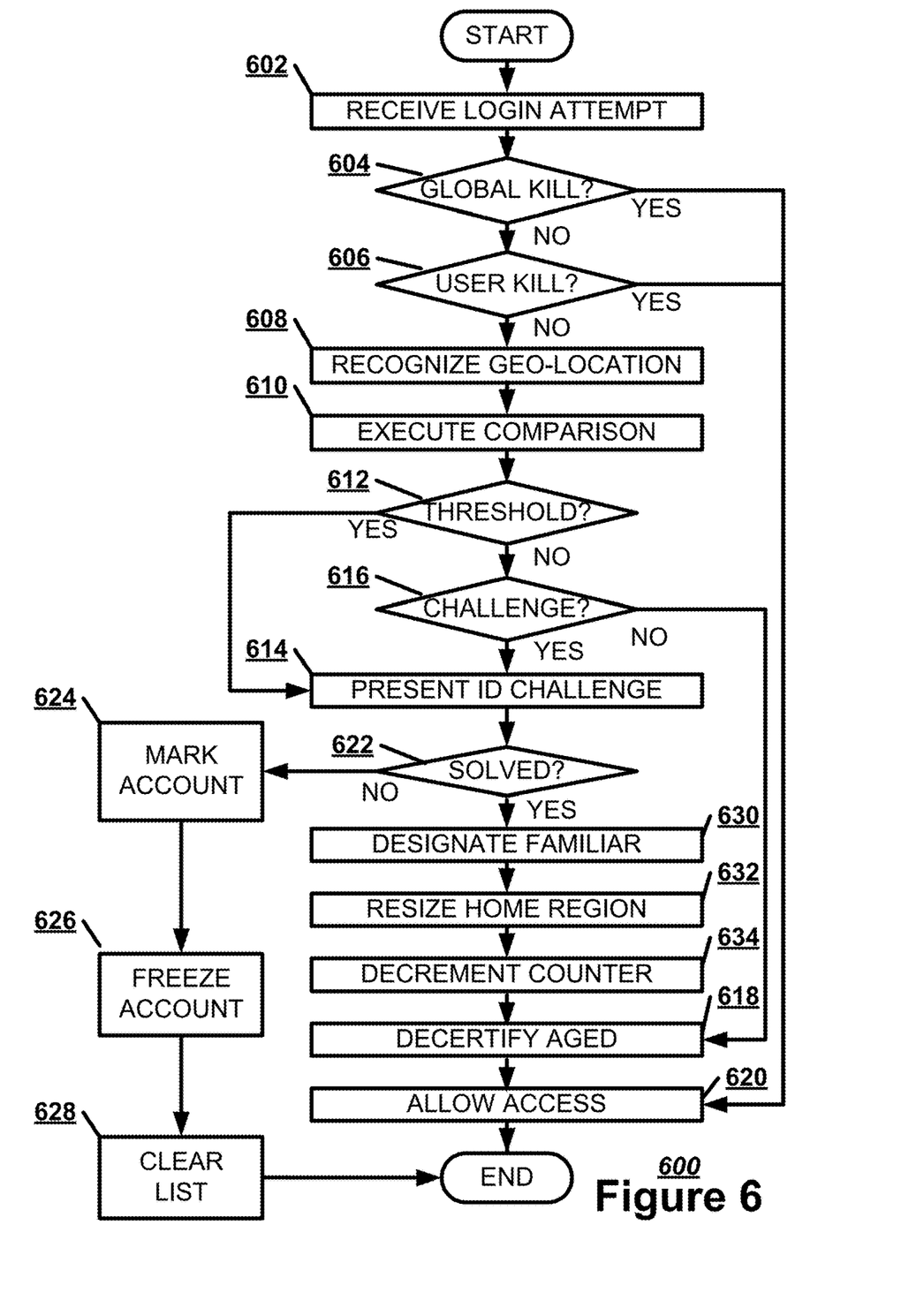
FIG. 6 illustrates, in a flowchart, one embodiment of a method for determining whether to present an enhanced identity challenge.

FIG. 6 illustrates, in a flowchart, one embodiment of a method 600 for determining whether to present an enhanced identity challenge. The user authentication server may receive from the user a user login attempt to a user service (Block 602). A user login attempt occurs when the user enters a password matching the password on file for that user. A user login attempt does not necessarily mean a completed login attempt in this circumstance. If a global kill switch has been activated (Block 604), the ability of the user authentication server to recognize the current geo-location is disabled. If a user kill switch has been activated (Block 606), the ability of the user authentication server to recognize the current geo-location is disabled.

The user authentication server may recognize a current geo-location of a user login attempt (Block 608). The user authentication server may execute a comparison of the current geo-location to a user location profile associated with a user account (Block 610). If the unfamiliar login location counter exceeds an unfamiliar login location threshold (Block 612), the user authentication server may present the user with an enhanced identity challenge (Block 614). The unfamiliar login location counter is a counter used to identify a series of user login attempts from unfamiliar login locations. Login attempts from multiple locations may often be used by malicious actors to mask their trail.

If the comparison indicates that an enhanced identity challenge is not desirable (Block 616), the user authentication server may decertify any familiar location with an expired aging period (Block 618). The aging period is the time since the last access by the user to a familiar location. If the user does not access the familiar location within a threshold time period, the aging period expires. The user authentication server may allow access to the user session (Block 620).

If the comparison indicates that an enhanced identity challenge is desirable (Block 616), the user authentication server may present the user with an enhanced identity challenge before allowing user access based on the comparison (Block 614). If the user does not successfully respond to the enhanced identity challenge (Block 622), the user authentication server may mark the account as a compromised account upon a failed response to the enhanced identity challenge (Block 624). The user authentication server may freeze the account, preventing future access to the account, even if the access has the correct user identifier and password (Block 626). The user authentication server may clear a familiar location list of the compromised account (Block 628). The familiar location list describes the familiar locations associated with the user account.

If the user successfully responds to the enhanced identity challenge (Block 622), the user authentication server may designate the current geo-location as a familiar location (Block 630). The user authentication server may resize the home region based on user activity (Block 632). The user authentication server may decrement or reset the unfamiliar login location counter based on familiarization process (Block 634). The user authentication server may decertify any familiar location with an expired aging period (Block 618). The user authentication server may allow access to the user session (Block 620).

Figure 7:
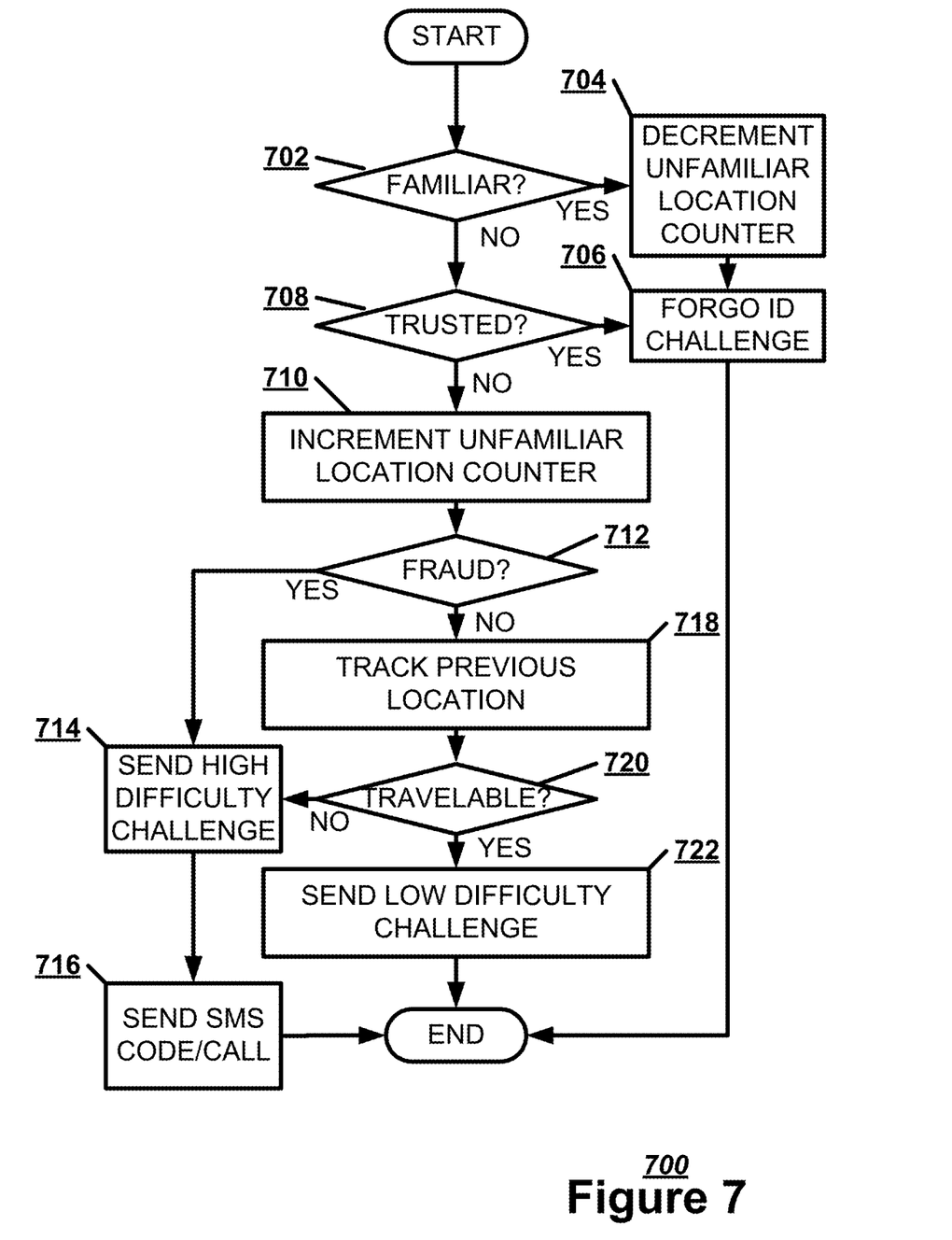
FIG. 7 illustrates, in a flowchart, one embodiment of a method for executing a comparison with a user location profile.

FIG. 7 illustrates, in a flowchart, one embodiment of a method 700 for executing a comparison with a user location profile. If the current geo-location is a familiar location that the user has been present in for a familiarity period (Block 702), the user authentication server may decrement or reset the unfamiliar login location counter based on familiarization process (Block 704). Thus the possibility of an enhanced identity challenge decreases after a period of user login attempts from a familiar location. The user authentication server may forgo an enhanced identity challenge (Block 706). If the user login attempt is from a trusted device (Block 708), the user authentication server may factor that in to a determination to forgo the enhanced identity challenge (Block 706). A trusted device is a device previously associated with a user. A trusted device may be identified by a login cookie or other identifying piece of code stored on a user device.

If the current geo-location is not a familiar location (Block 702) and the user login attempt is not from a trusted device (Block 708), the user authentication server may increment an unfamiliar login location counter (Block 710). If the current geo-location is a fraud hotspot (Block 712), the user authentication server may select a high challenge level for the enhanced identity challenge to be sent to the user (Block 714). The user authentication server may send a SMS code or an automated telephone call to a mobile telephone or landline number associated with the user account (Block 716). Additionally, the user authentication server may track whether the landline number is located near the current geo-location. The user authentication server may track in the user location profile an immediately previous location of a user (Block 718). If the user authentication server determines that the immediately previous location is not within traveling distance of the current geo-location (Block 720), the user authentication server may select a high challenge level for the enhanced identity challenge to be sent to the user (Block 714). If the user authentication server determines that the immediately previous location is within traveling distance of the current geo-location (Block 720), the user authentication server may select a low challenge level for the enhanced identity challenge to be sent to the user (Block 722).

A user authentication server may have a user attempting to access a compromised account perform some extra actions in order to safely identify the user. Additionally, a user may have lost or forgotten a password. The user authentication server may reset the password after presenting a high difficulty identity challenge.

Figure 8:
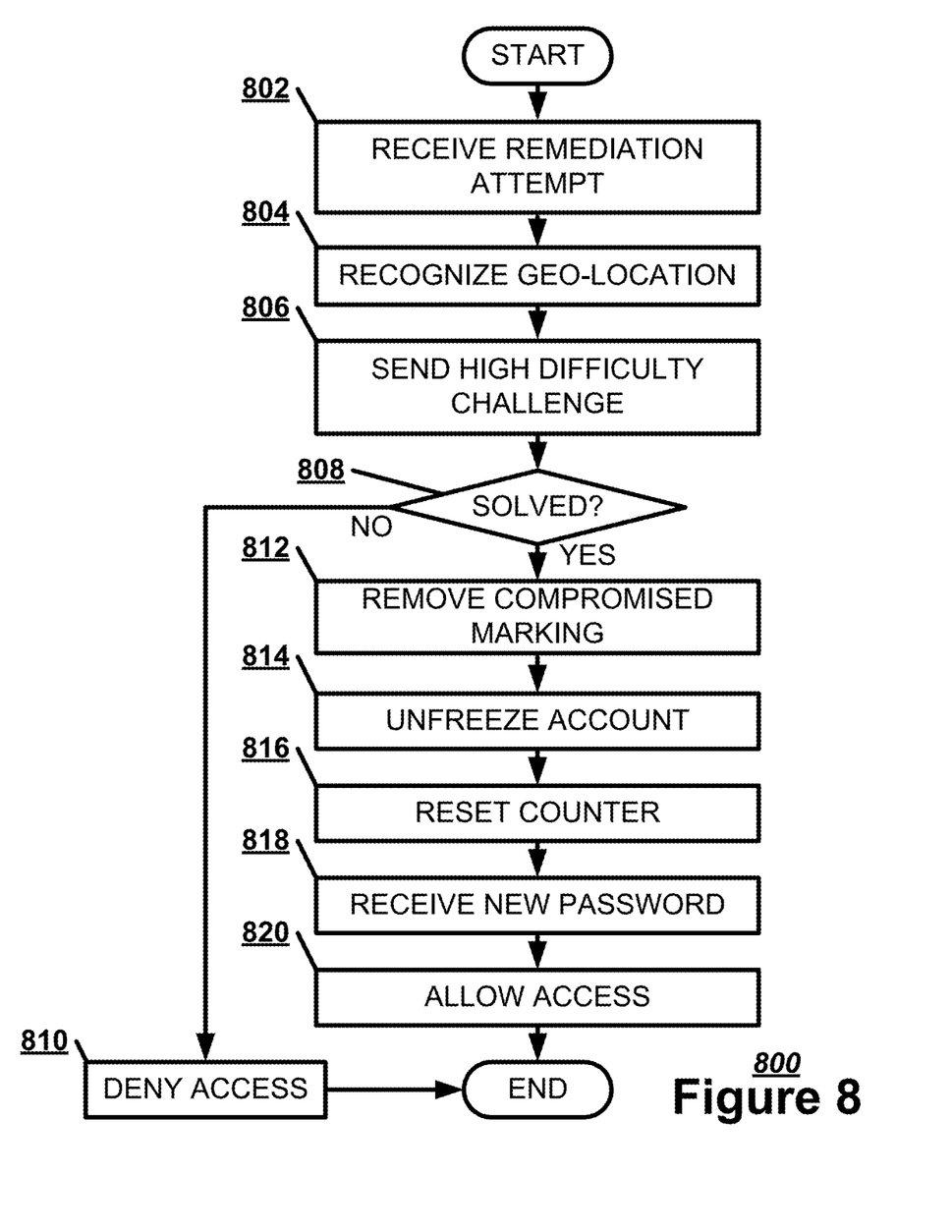
FIG. 8 illustrates, in a flowchart, one embodiment of a method for remediating a compromised account.

FIG. 8 illustrates, in a flowchart, one embodiment of a method 800 for remediating a compromised account or forgotten password. The user authentication server may receive from the user a remediation attempt for the user account (Block 802). The user authentication server may recognize a current geo-location of a user login attempt (Block 804). The user authentication server may present the user with a high difficulty identity challenge (Block 806).

If the user does not successfully respond to the enhanced identity challenge (Block 808), the user authentication server may deny access to the user session (Block 810). If the user does successfully respond to the enhanced identity challenge (Block 808), the user authentication server may remove the compromised marking from the compromised account (Block 812). The user authentication server may unfreeze the user account (Block 814). The user authentication server may decrement or reset the unfamiliar login location counter upon successful response to the enhanced identity challenge (Block 816). The user authentication server may reset the password to a new password received from the user (Block 818). The user authentication server may allow access to the user session (Block 820).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

The invention claimed is:

1. A user authentication server, comprising:
a communication interface configured to receive a user login attempt by a user and a current location of the user login attempt;
a data storage configured to store a user location profile of the user identifying a familiar location based on a login location history describing a location for a verified user login attempt, wherein the familiar location is removed from the user location profile after a time according to a defined condition based on a temporal status of the familiar location described in the login location history; and
a processor device configured to:
execute a comparison of the current location of the user login attempt to the familiar location of the user location profile,
based at least on the current location of the user login attempt being within the familiar location, not present an enhanced identity challenge during the user login attempt;
based at least on the current location being outside the familiar location and the user login attempt being made via an untrusted device, present the enhanced identity challenge for answering by the user before allowing user access, and
based at least on the current location being outside the familiar location while the user login attempt being made via a trusted device, not present the enhanced identity challenge.

2. The user authentication server of claim 1, wherein the data storage is configured to update the user location profile to store the current location as a new familiar location upon successful response to the enhanced identity challenge.

3. The user authentication server of claim 1, wherein the data storage is configured to track in the user location profile a previous location of the user.

4. The user authentication server of claim 1, wherein the processor is configured to determine whether an immediately previous location is within traveling distance of the current location and to select a challenge level for the enhanced identity challenge based on whether the current location is within traveling distance.

5. The user authentication server of claim 1, wherein the communication interface is configured to send the user a high difficulty identity challenge as an enhanced identity challenge if the current location is not within traveling distance.

6. The user authentication server of claim 1, wherein the data storage is configured to mark a user account as a compromised account upon a failed response to the enhanced identity challenge.

7. The user authentication server of claim 6, wherein the data storage is further configured to clear a familiar location list upon the failed response to the enhanced identity challenge.

8. The user authentication server of claim 1, wherein the communication interface is configured to collect a low difficulty identity challenge response and a high difficulty identity challenge response.

9. The user authentication server of claim 1, wherein the processor is configured to determine a home region based on the login location history.

10. The user authentication server of claim 1, wherein the processor is configured to resize the home region based on at least one of user activity and system configuration.

11. The user authentication server of claim 1, wherein the processor is configured to present the user with the enhanced identity challenge when an unfamiliar login location counter exceeds an unfamiliar login location threshold.

12. The user authentication server of claim 1, further comprising:
an unfamiliar login location counter configured to decrement upon successful response to the enhanced identity challenge.

13. A computing device being configured to:
store in a memory a user location profile of a user identifying a familiar location based on a login location history describing a location for a verified user login attempt, wherein the familiar location is removed from the user location profile after a time according to a defined condition based on a temporal status of the familiar location described in the login location history, recognize a current location of a user login attempt to a user service, execute a comparison of the current location of the user login attempt to the familiar location of the user location profile, based at least on the current location of the user login attempt being within the familiar location, not present an enhanced identity challenge during the user login attempt;

based at least on the current location being outside the familiar location and the user login attempt being made via an untrusted device, present a user with the enhanced identity challenge for answering by the user before allowing user access, and based at least on the current location being outside the familiar location while the user login attempt being made via a trusted device, not present the enhanced identity challenge.

14. The computing device of claim 13, wherein the computing device is further configured to mark a user account as a compromised account upon a failed response to the enhanced identity challenge.

15. The computing device of claim 13, wherein the computing device is further configured to clear a familiar location list of a compromised account.

16. The computing device of claim 13, wherein the computing device is further configured to factor whether the user login attempt is from a trusted device into a determination to present the enhanced identity challenge.

17. The computing device of claim 13, wherein the computing device is further configured to select a challenge level for the enhanced identity challenge based on whether the current location is a fraud hotspot.

18. A machine-implemented method for authenticating a user session, comprising:

storing in a memory a user location profile of a user identifying a familiar location describing a location for a verified user login attempt, wherein the familiar location is removed from the user location profile after a time according to a defined condition based on a temporal status of the familiar location described in the user location profile of the user in the memory;

recognizing a current location of a user login attempt to a user service over a communication interface;

using at least one hardware processor to implement:

executing a comparison of the current location to the familiar location of the user location profile;

based at least on the current location of the user login attempt being within the familiar location, not present an enhanced identity challenge during the user login attempt;

based at least on the current location being outside of the familiar location and the user login attempt being made via an untrusted device, presenting the user with a higher difficulty enhanced identity challenge for answering by the user before allowing user access; and based at least on the current location being outside the familiar location while the user login attempt being made via a trusted device, not presenting the higher difficulty enhanced identity challenge.

19. The method of claim 18, further comprising:

marking a user account as a compromised account upon a failed response to the enhanced identity challenge.

20. The method of claim 18, further comprising:

based at least on the current location being outside the familiar location while the user login attempt being made via a trusted device, presenting a lower difficulty enhanced identity challenge.

\* \* \* \* \*